United States Patent [19]
Tausch

[11] 3,891,588
[45] June 24, 1975

[54] NONSETTLING RUBBER CHEMICAL COMPOSITION AND METHOD OF PREPARING SAID COMPOSITION

[75] Inventor: Harry W. Tausch, Cuyahoga Falls, Ohio

[73] Assignee: The Goodyear Tire & Rubber Company, Akron, Ohio

[22] Filed: Apr. 21, 1969

[21] Appl. No.: 818,080

[52] U.S. Cl. 260/29.7 R; 260/29.2 R; 260/29.6 R; 260/29.6 RB; 260/29.6 PM; 260/29.7 UA; 260/29.7 EM; 260/45.95
[51] Int. Cl. C08d 7/04; C08f 45/00; C08g 51/00
[58] Field of Search 260/29.7, 45.95, 34.2, 260/29.6 PM, 41.5 PM, 29.2 R; 241/16, 20, 22; 106/309

[56] References Cited
UNITED STATES PATENTS

| | | | |
|---|---|---|---|
| 2,051,410 | 8/1936 | Kenney | 260/29.6 PM |
| 2,649,382 | 8/1953 | Vesce | 260/34.2 |
| 2,854,346 | 9/1958 | Todd | 106/290 |
| 3,048,562 | 8/1962 | Cull et al. | 260/45.5 |
| 3,305,522 | 2/1967 | Spacht | 260/45.95 |
| 3,462,390 | 8/1969 | Dunn | 260/41 R |

FOREIGN PATENTS OR APPLICATIONS

| | | | |
|---|---|---|---|
| 850,878 | 10/1960 | United Kingdom | 106/309 |

OTHER PUBLICATIONS

*Encyclopedia of Polymer Science and Technology;* 8, 165,6,9, (1967).
*Synthetic Rubber,* Whitby, Ed.–In–Chief, page 642 (John Wiley & Sons, Inc. 1954).
*The Vanderbilt Rubber Handbook,* (9th Ed. 1948) pages 282, 283 R. T. Vanderbilt Co.
*Latex In Industry–Noble,* 2nd Ed. Rubber Age, 1953, pages 224, 240, Noble, 264–265.
Patton, *Paint Flow and Pigment Dispersion,* pp. 402, 403 (Interscience, 1964).

*Primary Examiner*—Allan Lieberman
*Attorney, Agent, or Firm*—F. W. Brunner; J. A. Rozmajzl

[57] ABSTRACT

Finely divided solid rubber chemical compositions of a friable resinous hydrocarbon and a friable rubber chemical, such as a friable age resistor for rubber or a friable accelerator, used in the sulfur vulcanization of rubber, said compositions being capable of forming stable dispersions in a polymer latex, and a process for preparing said solid combination involving the grinding of the friable resinous hydrocarbon and the friable rubber chemical in the presence of one another.

14 Claims, No Drawings

NONSETTLING RUBBER CHEMICAL COMPOSITION AND METHOD OF PREPARING SAID COMPOSITION

This invention relates to a composition useful in preparing polymer latices having enhanced resistance to separation or migration of the composition away from the polymer particle. More particularly, it relates to a method of providing a polymer latex possessing rubber chemical compositions dispersed therein, said rubber chemical compositions having the tendency to remain suspended therein for extended periods of time without migrating up or down.

Polymer latices are often compounded by adding dispersions of solid, water insoluble compounding ingredients. These solid compounding ingredients or rubber chemicals include age resistors and vulcanizing ingredients. The age resistors include antioxidants and antiozonants. The vulcanizing ingredients include accelerators, zinc oxide and vulcanization agents, such as sulfur. Some rubber chemicals tend to separate or migrate away from the polymer particles and thus are unable to remain closely associated with the polymer particle per se. There is, therefore, a need for a method of preparing compounding ingredients in such a form that they can be dispersed in polymer latices and remain dispersed for extended periods of time with greatly reduced settling, i.e., migration.

An object of this invention is to provide a latex having enhanced resistance to separation or migration of rubber chemicals away from the polymer particle.

Another object of this invention is to provide a method for producing a latex having reduced settling.

The objects of the present invention are accomplished by a process of producing a composition useful in preparing a latex having enhanced resistance to migration comprising treating a mixture of friable hydrocarbon resin and a friable rubber chemical to obtain a blend comprising average particles of 0.1 to 30 microns and by adding the composition to a polymer latex. The friable hydrocarbon resin and friable rubber chemicals are used in ratios hereinafter described. The treatment normally consists of grinding the resin and rubber chemical, preferably in an aqueous medium, for a time sufficient to produce dispersable particles, the average particles being 0.1 to 30 microns in size, preferably the majority of the particles being within this range.

Migration, separation, settling and settling out as recited herein refer to the tendency of particles to migrate to an interface. For example, if a particle tended to rise to the surface of a latex or tended to migrate to the bottom of the latex container, it would be considered to be settling out of the latex in which it had been dispersed.

The term "friable rubber chemicals" includes such materials as friable age resistors, used in the compounding of polymers and polymer latices which are subject to oxygen, ozone and/or ultraviolet degradation. The term "age resistors" includes antioxidants, antiozonants and ultraviolet stabilizers. More specifically, it includes phenolic antioxidants and amine antioxidants and antiozonants. Specific examples of such age resistors are:

2,6-di-t.butyl-4-methylphenol
2,6-di-t.butylphenol
4-hydroxymethyl-2,6-di-t.butylphenol
2,6-di-t.butyl-alpha-methoxy-p-cresol
4,4'-bisphenol
2,2'-methylene-bis-(4-methyl-6-t.butylphenol)
2,2'-methylene-bis-(4-ethyl-6-t.butylphenol)
2,2'-methylene-bis-(4-methyl-6-alpha-methylcyclohexylphenol)
4,4'-methylene-bis-(2,6-di-t.butylphenol)
4,4'-methylene-bis-(2-methyl-6-t.butylphenol)
4,4'-butylidene-bis-(6-t.butyl-m-cresol)
4,4'-thio-bis-(2-methyl-6-t.butylphenol)
4,4'-thio-bis-(3-methyl-6-t.butylphenol)
phenyl-beta-naphthylamine
N,N'-diphenyl-p-phenylenediamine
N,N'-di-beta-naphthyl-p-phenylenediamine
polymerized 2,2,4-trimethyl-1,2-dihydroquinoline
N-cyclohexyl-N'-phenyl-p-phenylenediamine Exemplary of a rubber chemical which is particularly well adapted to the practice of this invention are phenolic antioxidants prepared by reacting one mol of dicyclopentadiene and a phenolic material selected from the group consisting of phenol, p-cresol, mixed m-p-cresol and p-ethyl phenol and further reacting the first reaction product in the presence of an acidic alkylation catalyst with at least one-half mol of an olefin selected from the group consisting of isobutylene, tertiary amylenes and tertiary hexylenes. In order to obtain a friable phenolic compound of this type the molar ratio of the phenolic material to the dicyclopentadiene should normally be about at least 2.5/1. These phenolic antioxidants and their preparation are more fully described in U.S. Pat. No. 3,305,522 issued to Ronald B. Spacht on Feb. 21, 1967. The first step of the reaction normally occurs at a temperature of from 25° to 160°C. in the presence of a Friedel-Craft type catalyst, preferably a boron trifluoride catalyst.

The term "friable rubber chemicals" also includes friable materials used in vulcanization systems for the vulcanization of polymers. Representative of the materials are zinc oxide, sulfur and any of the well known friable accelerators.

The following are representative examples of friable accelerators:

benzothiazyl disulfide
2-(morpholinothio)-benzothiazole
2-(morpholinodithio)-benzothiazole
2-mercaptobenzothiazole
zinc salt of 2-mercaptobenzothiazole
tetramethylthiuram disulfide
dipentamethylenethiuram tetrasulfide
tetramethylthiuram monosulfide
zinc dimethyldithiocarbamate The friable hydrocarbon resins useful in the present invention include all those hydrocarbons which are friable, i.e., which may be crumbled, pulverized or reduced to powder by grinding. For example, the majority of such hydrocarbons should normally be capable of being ground to an average particle size of about 30 microns or less in conventional ball mill equipment in less than 72 hours at temperatures of 50° to 80°F. under atmospheric conditions, if pulverized prior to grinding to an average particle size of less than 150 microns. However, they may be ground at various temperatures and pressures as long as the materials remain friable. Preferably, they are friable at room temperature under atmospheric conditions. These resins are represented by both saturated and unsaturated polymeric hydrocarbons, preferably thermoplastic and preferably possessing some degree of tackiness, i.e., being tackifying resins, particularly when the friable rubber chemical lacks tack. It is preferred that either the friable hydrocarbon resin or friable rubber chemical possess some tackiness. A tackifying resin is one which when added to raw rubber or a compounded rubber stock would increase the tendency of layers of the rubber to adhere more firmly together. That is, a tackifying resin would possess some degree of stickiness or adhesiveness that can normally be detected merely by rolling its powdery from between one's fingers. Representative classes of these hydrocarbon resins are coal tar resins, petroleum resins and terpene resins. Especially useful are cyclopentadiene resins, coumarone-indene resins and butylenepiperylene(1,3-pentadiene) resins. Normally, the resins have a number average molecular weight, as measured by osmotic techniques, of 5,000 or more and often 2,000 or less. These friable resins are normally derived from hydrocarbons having from 5 to 10 carbon atoms, although they may be derived from hydrocarbons having 5 to 12 carbon atoms and even 4 to 20 carbon atoms and more. The hydrocarbons include aliphatic hydrocarbons, alicyclic hydrocarbons and aromatic hydrocarbons. The hydrocarbons must contain at least one carbon to carbon double bond and include mono-olefins, diolefins, cyclic olefins, cyclic diolefins and vinyl derivatives of aromatic hydrocarbons.

Various resins which may be used in the practice of the present invention and their methods of preparation are included in the description of hydrocarbon resins occurring in Encyclopedia of Chemical Technology, vol. 11, pages 242 to 262, 1966, second edition, John Wiley and Sons, Inc.

The friable hydrocarbon resins preferably have a softening point according to ASTM Method E-28-58T of from about 50° to about 150°C. and more preferably from about 80° to about 130°C.

As previously mentioned, the hydrocarbon resins may be saturated or unsaturated. As an indication of unsaturation contained in the friable hydrocarbon resin it has been found that satisfactory resins have an iodine number according to ASTM Method D1959-61 of from about 40 to about 150, although the iodine number may be as low as 10 or even 0.

Representative of aromatic hydrocarbons which may be polymerized to form hydrocarbon resins are those having from 8 to 20 and preferably 8 to 12 carbon atoms, such as the terpenes, which include alpha-pinene, beta-pinene, dipentene, limonene, alpha-terpinene, myrcene, allo-ocimene, ocimene and other terpenes of the general formula $C_{10}H_{16}$. Other aromatic hydrocarbons include vinyl toluene and alpha-methyl styrene.

It is often desired to copolymerize at least one unsaturated hydrocarbon having one double bond (monoolefin) with at least one unsaturated hydrocarbon having more than one double bond (diolefin). Various mol ratios of diolefins to monoolefins can be used such as from about 20:80 to about 80:20. Representative of various diolefins are aliphatic diolefins having from 4 to 8 and preferably from 4 to 6 carbon atoms, particularly the conjugated dienes such as 1,3-butadiene, 2-methyl-1,3-butadiene (isoprene), 2-ethyl-1,3-butadiene and 1,3-pentadiene (piperylene), and aliphatic cyclic diolefins such as cyclopentadiene and dicyclopentadiene. It is usually preferred that at least one of the double bonds is alpha to the first carbon atom. Representative of various monoolefins are aliphatic monoolefins having from 3 to 8, and preferably from 4 to 6, carbon atoms, such as propylene, the various butenes, including 2-methyl-2-butene, the pentenes, the hexenes, the heptenes and octenes, and cyclic aliphatic monoolefins having from 5 to 8, and preferably from 5 to 6 carbon atoms, such as cyclopentene, cyclohexene, cycloheptene and cyclooctene.

Many of the resins are generally prepared by polymerizing the unsaturated hydrocarbons in an inert volatile solvent or diluent in the presence of a suitable catalyst such as a Friedel-Crafts type catalyst, preferably selected from aluminum chloride, aluminum bromide, stannic chloride, boron trifluoride, boron trifluoride etherate and also alkyl aluminum halides such as isopropyl aluminum dichloride. Usually, for convenience, particulate anhydrous aluminum chloride is preferred.

In the preparation of the resins, a wide range of temperatures are suitable for the polymerizations. For example, the polymerizations can normally be carried out in the range of from about −20° to about 100°C. and usually more preferably from about 0° to about 50°C. but above the freezing point of the reaction system and below its boiling point. Certainly, whether the pressure at which the reaction is being conducted should be taken into consideration when determining the optimum temperature. Normally, the polymerization reaction pressures may be atmospheric or above or below atmospheric pressure. Generally, a satisfactory polymerization is conducted at about autogenous pressure developed under the operating conditions used.

Exemplary of a preferred thermoplastic tackifying resin for this invention comprises from about 20 to about 80 units derived from piperylene and correspondingly from about 80 to about 20 units derived from 2-methyl-2-butene. The tackifying resin typically has a softening point of from about 80° to about 110°C. The preparation of such a resin polymer is more fully described in U.S. Pat. application Ser. No. 556,293, filed June 9, 1966 now abandoned. Such a resin polymer can be prepared, for example, by polymerizing a mixture comprising from about 20 to about 75 weight percent of piperylene and from about 80 to about 25 weight percent of 2-methyl-2-butene in the presence of an anhydrous catalyst selected from aluminum chloride, aluminum bromide, stannic chloride, and boron trifluoride at a temperature of from about 0° to about 50°C. It is usually preferred to conduct the polymerization in an inert volatile organic solvent using aluminum chloride having a mesh size of from about 50 to about 200 U.S. Sieve size as the catalyst. The resin polymers can be modified by containing up to about 25 percent by weight units derived from piperylene dimers, piperylene trimers, and other unsaturated hydrocarbons containing from 4 to 6 carbon atoms such as butene and substituted butenes such as 2-methyl-1-butene, 2,3-di-methyl-1-butene, 2,3-dimethyl-2-butene, 3,3-dimethyl-1-butene; the pentenes and substituted pentenes such as 1-pentene, 2-pentene, 2-methyl-1-pentene, 2-methyl-2-pentene, 3-methyl-2-pentene, 4-methyl-1-pentene; 4-methyl-2-pentene, the hexenes such as 2-hexene, diolefins such as isoprene, and cyclic unsaturated hydrocarbons such as cyclopentene, cyclohexene and 1,3-cyclopentadiene.

The average particle size of the friable rubber hydrocarbon resin/friable rubber chemical combination may vary from about 0.1 micron to about 30 microns. Preferably, the particle size ranges from about 1 to about 15 microns. The most preferred particle size is about 2 microns. In most instances the particle size will vary. Preferably a substantial number, i.e., over half of the particles will possess a particle size within the ranges described above. Most preferably, essentially all of the particles are of a size within the above limits.

Any polymer latex which may be compounded with friable rubber chemicals per se may be compounded with the compounds of the present invention. For example, latices of butadiene/styrene copolymers (SBR), butadiene/acrylonitrile copolymers (NBR), neoprene and natural rubber latices may be used. The term "latex serum" when referred to herein, refers to the aqueous medium in which the polymer latex particles are suspended. The specific gravity of this medium is around 1.00 in most instances.

In general, the following procedure may be followed. The friable hydrocarbon resin and friable rubber chemical are added to water containing a dispersing agent. Any of the well known conventional dispersing agents may be used, i.e., any dispersing aid or agent which will aid in dispersing a solid in an aqueous liquid. Representative examples include anionic, cationic, and non-ionic surface active agents and protective colloids. As is generally the case in the dispersion art, the dispersing agent is selected based on the material being dispersed and the emulsification system of the polymer latex to which it is to be added. Preferably, the resin and rubber chemical are pulverized prior to their addition to the aqueous medium. The resin and rubber chemical can be pulverized so that a majority of the particles preferably have a particle size of less than 150 microns. Their order of addition is not critical. The resin and rubber chemical, along with water, if desired, can be combined directly in a grinding apparatus or in a separate container at a temperature below their melting points. They are then ground for varying lengths of time, depending upon the grinding apparatus, the resin and the rubber chemical being used. If a ball mill is employed on the pulverized material, normally a time of from about 6 hours, and sometimes less, to about 72 hours is sufficient to obtain a particle size between 0.10 micron and 30 microns. Other grinding equipment, such as a Szegvari Attritor, may be used, if desired. The resulting dispersion may be stored, sometimes without agitation. Preferably the dispersion is shaken or agitated in some other fashion prior to its addition to the latex. The dispersion is then added with agitation to the polymer latex.

It has been found that on standing the rubber chemical composition of the present invention remains suspended in the latex for a greater length of time than if the rubber chemical were dispersed by itself.

The tendency of particles of rubber chemicals to settle out of a latex will normally vary according to the viscosity of the latex, and the particle size of the rubber chemical. The present invention, for a given latex viscosity and a given particle size results in a lessening of the tendency of the rubber chemical to settle out of the latex.

The following examples are intended to include illustrations of the practice of the process of the present invention, but are not intended to be limiting as to the invention described herein. All parts and percentages are by weight unless otherwise indicated.

In each of the following examples the materials are ground in a variable speed, water-jacketed laboratory Szegvari Attritor, type SV, size 01 at a speed of about 700 revolutions per minute and at a temperature of about 55° to 70°F. using 3/16 inch ceramic balls. The same latex is used in each of the following examples, i.e., a 45/55 acrylonitrile/1,3-butadiene latex prepared by hot emulsion polymerization techniques using a rosin acid soap emulsification system and having a Mooney (MS-1½) of about 135 to 150. The latex solids content is about 40.5 percent.

EXAMPLE 1

A thermoplastic tackifying resin is prepared by the following method:

To a reactor is charged 200 parts of heptane and 6 parts of anhydrous aluminum chloride at a temperature of about 25°C. While continuously stirring the mixture, 400 parts of a hydrocarbon mixture containing unsaturated hydrocarbons is slowly added to the reactor over a period of about 90 minutes. The temperature of the reaction is thereafter maintained in a range of about 25° to about 30°C. for about 60 minutes. The hydrocarbon mixture has the following composition:

| Component | Percent |
| --- | --- |
| 2-pentene | 5.1 |
| 2-methyl-2-butene | 32.9 |
| Isoprene | 3.1 |
| 1,3-pentadiene (piperylene) | 27.5 |
| 2,3-dimethyl-1-butene | 2.1 |
| 4-methyl-2-pentene | 19.4 |
| Unsaturated hydrocarbons containing 5 to 6 carbon atoms | 10.5 |
| | 100.6 |

After this polymerization, 25 parts of water, 8 parts of particulate hydrated calcium hydroxide and 8 parts of Attapulgus clay are added to the polymerizate. Agitation is provided to suspend the hydrated calcium hydroxide at about 90°C. and continued for about 120 minutes. The mixture is then filtered to remove the insoluble catalyst residue, excess calcium compound and clay. The filtrate is then steam distilled to a pot temperature of about 235°C. The resulting residual molten resin is poured from the reactor onto an aluminum tray and cooled to about 25°C. to form 173 parts of a hard brittle resin having a pale yellow color, and having a softening point, according to ASTM Method E28-58 T of 94°C. The specific gravity of the product is about 0.92 to 0.94.

EXAMPLE 2

Three hundred and thirty grams of para-cresol and 9.0 grams of a phenol $BF_3$ complex containing 26 percent $BF_3$ are heated to 100°C. and then 132 grams of dicyclopentadiene are added over a period of 3½ hours. The excess para-cresol is removed by heating to a column temperature of 150°C. at 4 mm. This procedure also removes the $BF_3$ catalyst. A residue of 316 grams is obtained.

Two hundred and thirty-six grams of this product are dissolved in an equal weight of toluene and 4.0 grams of $H_2SO_4$ added. The solution is heated to 80°C. and 168 grams of isobutene added over a period of 1¾ hours. The mixture is heated one hour longer and then the catalyst is destroyed with a $Na_2CO_3$ solution. Volatiles and unreacted materials are removed by heating to 175°C. at 30 mm. Catalyst residues are removed by filtration. Weight of the product is 313 grams. The specific gravity of the product is about 1.09 to 1.10.

EXAMPLE 3

The resin described in Example 1 is pulverized in a mortar with a pestle. 46.4 grams of a pulverized form of the phenolic antioxidant prepared in Example 2 and 53.6 grams of the pulverized resin are placed in the Szegvari Attritor. 5.0 grams of Nacconol NRSF (sodium salt of dodecyl benzene sulfonic acid) is then added to the attritor. One gram of concentrated ammonium hydroxide and 74 grams of water are combined and added to the attritor. The combination is ground in the attritor for 4 hours. This is referred to herein as Run A. In Run B, 100 grams of the pulverized phenolic antioxidant are ground in the same fashion with no resin present. In each case the dispersions are transferred to a container and stored without agitation. Later the dispersions are stirred in the container and portions weighed out for addition to an acrylonitrile/1,3-butadiene latex. 12.9 grams of the Run A dispersion and 6.0 grams of the Run B dispersion are added to separate 247 gram portions of the latex with agitation and both portions allowed to stand. Signs of settling out were noted in the latex containing the dispersion from Run B within the first few days. The latex containing the product of Run A showed practically no signs of settling out after several days. The product of a run very similar to that of Run A was placed in an acrylonitrile/butadiene latex and showed practically no signs of settling out after 25 days.

EXAMPLE 4

The compounding ingredients used in the following runs include 2.5 drops of a silicone antifoaming agent, 6.6 grams of sodium dodecyl diphenyl-ether disulfonate, 15.0 grams of the sodium salt of a carboxylated polyelectrolyte, 2.5 grams of a 75 percent aqueous dioctyl ester of sodium sulfosuccinic acid and 15.0 grams of tetrapotassium pyrophosphate.

One hundred and fifty grams of powdered zinc oxide, having a specific gravity of about 5.57, is added to the Szegvari Attritor. The compounding ingredients are then added to the attritor. One hundred and eighty-five grams of water are combined with 1.5 grams of concentrated ammonium hydroxide and added to the attritor. The combination is ground in the attritor for 2 hours. This is referred to herein as Run C. The same procedure is followed in Runs D and E with the following exceptions. In Run D, the amount of zinc oxide is reduced to 75 grams, and 75 grams of the resin in pulverized form and described in Example 1 is also added to the attritor. In Run E, 12.6 grams of the zinc oxide are used along with 137.4 grams of the pulverized resin. In each case the dispersions are transferred to a container and stored without agitation. Later, the dispersions are stirred in the container and portions weighed out for addition to an acrylonitrile/1,3-butadiene latex. To three separate 250 gram portions of the acrylonitrile/butadiene latex are added 15 grams of the dispersion of Run C, 30 grams of the dispersion of Run D and 176.5 grams of the dispersion of Run E with agitation. The latices are then allowed to stand. On standing overnight the latices containing the dispersions of Runs C and D show signs of settling out. However, the settling out is more pronounced in the former latex. Settling out in the latex containing the dispersion of Run E does not occur for several days.

EXAMPLE 5

28.1 grams of zinc dibutyl dithiocarbamate and 71.9 grams of the resin of Example 1 in pulverized form are added to the Szegvari Attritor. 0.56 gram of sodium hydroxide, 1.5 grams of concentrated ammonium hydroxide and 4.44 grams of dodecyl benzene sulfonic acid are added to 94.0 grams of water and the aqueous combination added to the attritor. The materials are then ground for 2 hours. They are then transferred to another container. This is referred to herein as Run F. In Run G the same procedure is followed using 100 grams of zinc dibutyl dithiocarbamate and no resin. The dispersions are agitated and portions weighed out for addition to an acrylonitrile/1,3-butadiene latex. 7.1 grams of the Run F dispersion are added to 247 grams of the latex with agitation. Two grams of the Run G dispersion are added to 247 grams of the latex with agitation. On standing, the zinc dibutyl dithiocarbamate added from Run F settles out of the latex at a rate much less than that of the dithiocarbamate added in the form of the Run G dispersion.

Runs A, D, E, and F represent the practice of the present invention. They illustrate the improvement in the prevention of settling obtained using the teachings related herein. Piccolyte Alpha 100, a resin prepared from alpha pinene was used in combination with 4,4'-butylidene-bis-(6-t.butyl-m-cresol) and caused the phenolic compound to settle at a lower rate. The resins used in the practice of the present invention, in order to be friable, normally should possess a number average molecular weight of at least 500 to 1,000.

As the specific gravity of the latex serum to which the nonsettling rubber chemical composition is to be added varies, preferably the specific gravity of the nonsettling rubber chemical composition is varied accordingly, the principle involved being that the specific gravity of the nonsettling rubber chemical composition be as close as possible to that of the polymer latex serum. Therefore, the resin and resin/rubber chemical ratios are selected to produce on grinding, particles, their average specific gravity and preferably a substantial number of the particles possessing a specific gravity which differs by a lesser degree from the specific gravity of the latex serum than does the specific gravity of the friable rubber chemical.

The basic principle involved herein only requires that the average specific gravity of the friable hydrocarbon resin/friable rubber chemical combination be closer to the specific gravity of the polymer latex serum to which the combination is to be added than the specific gravity of the friable rubber chemical itself.

For example, combinations which may be used include those where the specific gravity of the friable rubber chemical is greater than that of the polymer latex serum, and the specific gravity of the friable hydrocarbon resin is less than the specific gravity of the polymer latex serum. If the specific gravity of the friable rubber chemical is less than the specific gravity of the polymer latex serum to which the combination is to be added, it is preferred that the specific gravity of the friable hydrocarbon resin be greater than the specific gravity of the polymer latex serum. Also, within the scope of the present invention is the use of a friable hydrocarbon resin/friable rubber chemical combination wherein both components possess a specific gravity greater than or less than the specific gravity of the latex serum in which the combination is to be dispersed. Preferably, in these cases the specific gravity of the friable hydrocarbon resin is closer to the specific gravity of the polymer latex serum than is the specific gravity of the friable rubber chemical. Preferably, in no instance where the specific gravities of the friable hydrocarbon resin and the friable rubber chemical are both greater than or less than the specific gravity of the polymer latex serum should the specific gravity of the friable rubber chemical be closer to that of the polymer latex serum than the specific gravity of the friable hydrocarbon resin. It should be noted that when the specific gravity of the resin and the specific gravity of the rubber chemical are both greater or both less than the specific gravity of the latex serum, the specific gravity of the combination normally will not be equal to that of the latex serum, but will be closer to the specific gravity of the serum than is the specific gravity of the rubber chemical, if the above guidelines are followed.

Using the guidelines discussed above, the ratio in which the friable hydrocarbon resin and friable rubber chemical are combined and ground can normally be determined by the use of the following relationship:

$$\frac{x}{(SG_A)} + \frac{SG_c - x}{(SG_B)} = 1$$

wherein $x/SG_c$ is equal to the weight fraction of the friable hydrocarbon resin which is charged and $SG_c - x/SG_B$ is equal to the weight fraction of the solid rubber chemical which is charged. Preferably $x/SG_c - x$ is 2/1 or less and most preferably 1/1 or less. $SG_A$ is equal to the specific gravity of the friable hydrocarbon resin while $SG_B$ is equal to the specific gravity of the solid rubber chemical being charged. $SG_c$ is the specific gravity of the combination. Preferably $SG_c$ is equal to the specific gravity of the latex serum ±5 percent, i.e., preferably from about 0.95 to about 1.05, since latex serums normally possess a specific gravity closely approximating 1.00. In some cases the specific gravity of the rubber chemical may be so different from that of the latex serum that very large quantities of hydrocarbon resin are necessary to obtain a combined specific gravity equal to that of the latex serum. In many instances such high amounts of resin might be impractical and/or too expensive.

Also, according to the above equation where both $SG_A$ and $SG_B$ are greater than or less than the specific gravity of the serum, $SG_c$ can never equal the specific gravity of the serum. However, it must be noted that even though the attainment of an ideal specific gravity might be impractical or impossible, the specific gravity of the rubber chemical can be adjusted, using the above guidelines and equation, to reduce its tendency to settle by adding specific amounts of hydrocarbon resin, and, therefore, to that extent, offer an improvement.

As with the friable hydrocarbon resins, the friable rubber chemicals should normally be capable of being ground to an average particle size of about 30 microns or less in conventional ball mill equipment in less than 72 hours at temperatures of 50° to 80° F. under atmospheric conditions, if pulverized prior to grinding to an average particle size of less than 150 microns. However, they may be ground at various temperatures and pressures as long as the materials remain friable. Preferably, they are friable at room temperature under atmospheric conditions.

Although it is preferred that the average particle size of the materials after grinding be in the 0.10 to 30.0 micron range, the average particle size may be outside this range, e.g., from 0.01 to 100 microns.

A preferred combination comprises a 20/80 to 80/20 weight ratio combination of the phenolic antioxidants prepared using dicyclopentadiene and earlier described herein, and the friable hydrocarbon resins comprising from 20 to 80 units derived from piperylene and correspondingly from 80 to 20 units derived from 2-methyl-2-butene, described earlier herein. Preferably the ratio is about 60/40 to 50/50 of the resin to the phenolic antioxidant.

While certain representative embodiments and details have been shown for the purpose of illustrating the invention it will be apparent to those skilled in this art that various changes and modifications may be made therein without departing from the spirit or scope of the invention.

What is claimed is:

1. A process of preparing a compounded polymer latex containing a rubber chemical comprising (A) preparing a resin/rubber chemical composition by grinding in an aqueous medium, containing a dispersing agent and consisting essentially of water, a mixture of tackifying friable hydrocarbon resin and a friable rubber chemical the friable hydrocarbon resin and weight ratio of the friable hydrocarbon resin to the friable rubber chemical being selected to produce, on grinding, particles, the average specific gravity of the particles differing by a lesser degree from the specific gravity of the latex serum than does the specific gravity of the friable rubber chemical, and grinding the friable mixture for a time sufficient to produce dispersible particles, over half of the particles possessing a particle size of from 0.01 micron to 100 microns and wherein the weight ratio of the friable hydrocarbon resin to the friable rubber chemical is determined by the following relationship:

$$\frac{x}{SG_A} + \frac{SG_c - x}{SG_B} = 1$$

wherein $x/SG_c$ is the weight fraction of the hydrocarbon resin, $SG_c - x/SG_c$ is the weight fraction of the friable rubber chemical, $SG_c$ is the specific gravity of the combination, $SG_A$ is the specific gravity of the friable hydrocarbon resin, and $SG_B$ is the specific gravity of the friable rubber chemical and wherein $SG_c$ is closer to the specific gravity of the latex serum than is $SG_B$, and (B) combining the polymer latex and the resin/rubber chemical composition under agitation wherein the resin/rubber chemical composition is added in an amount sufficient to provide an additive amount of the rubber chemical.

2. A compounded polymer latex prepared according to the process of claim 1.

3. The process according to claim 1 wherein the friable hydrocarbon resin is a tackifying resin.

4. The process according to claim 3 wherein the friable hydrocarbon resin is a thermoplastic tackifying resin.

5. The process according to claim 1 wherein the friable hydrocarbon resin is polymerized from hydrocarbons having 5 to 12 carbon atoms.

6. The process according to claim 1 wherein the friable hydrocarbon resin is a thermoplastic tackifying resin prepared from the polymerization of a mixture comprising piperylene and 2-methyl-2-butene and comprised of from about 20 to about 80 units derived from piperylene and correspondingly from about 80 to about 20 units derived from 2-methyl-2-butene, said resin having a softening point from about 80° to about 110° C.

7. The process according to claim 1 wherein the friable rubber chemical is a phenolic antioxidant formed by (1) reacting at a temperature of from 25° to 160° C. in the presence of a Friedel-Craft type catalyst, one mol of dicyclopentadiene and at least 2.5 mols of a phenolic material selected from the group consisting of phenol, para-cresol, mixed meta-para-cresol and para-ethyl phenol and (2) further reacting the first reaction product in the presence of an acidic alkylation catalyst with at least one-half mol of an olefin selected from the group consisting of isobutylene, tertiary amylenes and tertiary hexylenes.

8. The process according to claim 7 wherein the friable mixture is ground for a time sufficient to produce dispersable particles, a substantial portion thereof possessing a particle size of from 1 to 15 microns.

9. The process according to claim 1 wherein over half of the particles are 0.10 micron to 30 microns in size.

10. The process according to claim 1 wherein $SG_r$ is $1.00 \pm .05$.

11. The process according to claim 1 wherein over half of the particles are one micron to 15 microns in size.

12. The process according to claim 1 wherein the polymer latex is a rubber latex.

13. The process according to claim 1 wherein the weight ratio of resin to rubber chemical is from 80/20 to 20/80.

14. The process according to claim 7 wherein the friable hydrocarbon resin is a thermoplastic tackifying resin prepared from the polymerization of a mixture comprising piperylene and 2-methyl-2-butene and comprised of from about 20 to about 80 units derived from piperylene and correspondingly from about 80 to about 20 units derived from 2-methyl-2-butene, said resin having a softening point from about 80° to about 110° C. and wherein the weight ratio of resin to rubber chemical is from 80/20 to 20/80.

* * * * *